US005476686A

United States Patent [19]

Fritz

[11] Patent Number: 5,476,686

[45] Date of Patent: Dec. 19, 1995

[54] WOOD PROTECTION COMPOSITION

[76] Inventor: Hubert Fritz, Daxberg 33, D 8941 Erkheim, Germany

[21] Appl. No.: 84,482

[22] Filed: Jul. 1, 1993

[30] Foreign Application Priority Data

Jul. 1, 1992 [DE] Germany .......................... 42 21 624.9

[51] Int. Cl.$^6$ .......................... C09D 5/00; C09D 189/00; B27K 5/00

[52] U.S. Cl. .......................... 427/397; 106/15.05; 106/16; 106/17; 106/18; 106/18.11; 106/18.29; 106/138; 106/142; 106/144; 106/145; 106/146; 106/148; 427/393

[58] Field of Search .......................... 106/15.05, 16, 106/17, 18, 18.11, 18.29, 138, 142, 144, 145, 146, 148; 252/380, 383; 426/41, 583; 427/393, 397

[56] References Cited

U.S. PATENT DOCUMENTS

| | | | |
|---|---|---|---|
| 2,904,437 | 9/1959 | Czarnetsky | 426/41 |
| 3,616,386 | 10/1971 | Scheder | 204/296 |
| 3,864,506 | 2/1975 | Grindstaff et al. | 426/356 |
| 3,882,256 | 5/1976 | De Boer | 426/583 |
| 4,064,283 | 12/1977 | Saunders et al. | 426/583 |
| 4,076,800 | 2/1978 | Marsh et al. | 424/70 |
| 4,138,501 | 2/1979 | Chaveron et al. | 426/239 |
| 4,225,629 | 9/1980 | Saunders et al. | 426/583 |
| 4,227,981 | 10/1980 | Williams et al. | 204/301 |
| 4,444,792 | 4/1984 | Schwartz et al. | 426/41 |
| 4,528,203 | 7/1985 | Harris et al. | 426/555 |
| 4,718,943 | 1/1988 | Alscher et al. | 106/15.05 |
| 4,786,326 | 11/1988 | Grove | 106/15.05 |
| 4,847,096 | 7/1989 | Mellquist et al. | 426/41 |
| 4,950,329 | 8/1990 | McIntyre et al. | 106/15.05 |
| 4,956,177 | 9/1990 | King et al. | 426/41 |
| 4,963,387 | 10/1990 | Nakagawa et al. | 426/649 |
| 4,973,488 | 11/1990 | Ernster | 426/580 |
| 4,988,545 | 1/1991 | Laks | 106/15.05 |
| 5,078,912 | 1/1992 | Goettsche et al. | 106/15.05 |
| 5,098,472 | 3/1992 | Watkins et al. | 106/15.05 |

*Primary Examiner*—Anthony Green
*Attorney, Agent, or Firm*—Jacobson, Price, Holman & Stern

[57] ABSTRACT

A wood protection composition comprising whey saponified with an alkali. The saponification may be carried out using caustic soda solution or sodium carbonate. In particular, diluted whey is used. The wood protection composition is suitable primarily for the treatment of wood shavings for use as insulating material in building construction. A method of manufacturing a wood protection composition according to the present invention is also disclosed.

19 Claims, No Drawings

WOOD PROTECTION COMPOSITION

BACKGROUND OF THE INVENTION

This invention relates to a wood protection composition and to the use of such a wood protection composition.

A wood protection composition should protect wood as much as possible against the effects of fungi, bacteria and animals. At the same time it should provide protection against fire or at least have a fire retarding effect. The wood protection composition should also be non-toxic to humans and domestic animals and should be inexpensive to manufacture.

A wood protection composition should also permit treated wood to be readily disposed of without any problems, for example when a treated wooden structure is demolished.

SUMMARY OF THE INVENTION

The object of the present invention is to provide a wood protection composition which satisfies the above mentioned requirements as optimally as possible.

To achieve this objective, a wood protection composition is provided comprising whey that has been saponified with an alkali.

DETAILED DESCRIPTION OF THE INVENTION

Whey occurs in relatively large quantities in the processing of milk. When fat and casein are separated from milk by acidification or the addition of the enzyme, rennin, whey remains as a residue which contains, amongst other things approximately 0.9 g protein, 0.3 g fat and 4.5 g lactose per 100 g. This whey is saponified with an alkali preferably after dilution with water in approximately the same quantity to that of the whey. Saponification of the whey with an alkali is preferably carried out with caustic soda solution. It is however also possible to perform saponification of the whey with sodium carbonate (soda). Saponification of the whey is not limited to the remaining portion of fat in the whey, saponification of the other constituents such as protein and milk sugar (lactose) can also take place.

Saponification can also be carried out using an aqueous alkali soda aluminum hydroxide solution. Good results have also been obtained with this substance.

When wood is treated with a wood protection composition prepared in accordance with the present invention and the wood protection composition is applied, for example, by spraying, painting or dipping, the wood to be treated is protected against pests. This is due to the wood protection composition having a high pH value. Furthermore, the protection composition appears to penetrate the wood, so that protection is not merely on the surface of the wood.

Since the materials for making the wood protection composition of the present invention are relatively cheap, it is commercially viable to use this wood protection composition for the treatment of, for example, wood shavings, in particular shavings from wood that has been planed. In this manner it is envisaged that the wood protection composition of the present invention could be used for the treatment of insulation materials (which consist of wood shavings) used in building construction. In this case, the wood shavings are thoroughly sprayed with or dipped in the wood protection composition so that a majority of the surface area of the wood shavings is coated. It is thought that even very thin shavings can be protected, once the shavings have been coated and dried, whereby long lasting protection is achieved provided that suitable measures are taken to prevent leaching. When using wood shavings treated with the composition of the present invention for insulation, such as the type described above, treated wood shavings can be introduced into corresponding building components simply by pouring. Alternatively a stuffing process can be used. Furthermore, blowing of the treated wood shavings into a cavity to be insulated is also possible.

Since the wood protection composition of the present invention consists essentially of naturally occurring materials, the disposal of any waste or used composition or treated material presents no problems. By the addition of diluted hydrochloric acid it is also possible to neutralise the alkali pH value of the wood protection composition permitting the disposal of residues without any problems.

It is thought that the wood protection composition according to the present invention influences in particular the lignin component of the wood which is attacked by pests of various kinds. The high pH value also repels pests such as, for example, ants, which do not themselves actually attack the wood.

If wood treated with the protection composition according to the present invention is burned, no damaging substances are produced. The treated wood can therefore be fully utilised e.g. for energy.

The flame retarding effect of the wood protection composition appears to result from, on the one hand, the fact that the wood protection composition coats the surface of the otherwise flammable wood material. Furthermore, burning of the wood protection composition appears to produce non-combustible gases which reduce the supply of oxygen to the wood material.

It has also been found that the wood protection composition of the present invention beneficially affects any steel components connected to the wood being protected. That is, coating with the wood protection composition slows the formation of rust.

It is envisaged that leaching can be reduced or hindered by the application of wax or resin, for example acrylate. Also, the application of natural colouring materials, for example carotene, can be beneficial. In this way treated wooden components can be marked to show that they have been treated with the wood protection composition.

As already mentioned the wood protection composition of the present invention is particularly suitable for impregnating small particulate wood pieces, for example wood shavings or wood wool. Cellulose flakes and other miscellaneous products such as straw, rushes, peat or coco fibre can also be treated. In the treatment of mineral wool, the typical properties of the wood protection composition are not utilised, although in this case the strong alkali effect is beneficial. In addition, in all cases the wood protection material of the present invention has the advantage of cementing fine dust particles achieved by the formation of soap.

EXAMPLES

Example 1

50 parts by weight of fresh whey was diluted with 50 parts by weight of water. 3 parts by weight of soda or 1 part by weight of concentrated caustic soda solution were added.

Example 2

Whey powder can also be used as a starting material. In this case, whey powder is dissolved in a 30-fold quantity of water. 100 parts by weight of diluted whey is obtained, which is then saponified with an alkali as described in example 1.

Example 3

An aqueous alkali soda aluminum hydroxide solution is used instead of caustic soda or soda. 0.5 parts by weight of the solution is sufficient to saponify 100 parts by weight of diluted whey.

Example 4–11

Fresh whey is saponified by stirring the whey into a hydrous base at a temperature of 50° C. The base is produced by dissolving and/or suspending a corresponding alkaline component in warm water, having a temperature of 50° C.

Saponification occurs at varying conditions. The following table shows the relative amounts of whey, water and base (percentages by weight) and the pH value of the final product with respect to each of the examples illustrated.

| example no. | parts by weight whey (%) | parts of weight water (%) | parts of weight base (%) | | pH-value of final product |
|---|---|---|---|---|---|
| 4 | 47 | 47 | soda | 6 | 10 |
| 5 | 47 | 48 | soda | 2 | 8 |
| | | | $NaHCO_3$ | 3 | |
| 6 | 70 | 22 | soda | 4 | 11.5 |
| | | | lime | 4 | |
| 7 | 70 | 24 | soda | 2 | 9.5 |
| | | | borax | 4 | |
| 8 | 50 | 45 | NaOH | 2 | 11 |
| | | | $Al(OH)_3$ | 3 | |
| 9 | 70 | 24 | NaOH | 1 | 10 |
| | | | borax | 4 | |
| 10 | 50 | 49.5 | NaOH | 0.5 | 12 |
| 11 | 50 | 47 | NaOH | 3 | 13 |

Chips of wood were mixed constantly with each of the above-mentioned compositions until they were completely coated (examples 4–11). 1 kg of wood chips absorbed about 1 kg of composition.

The treated wood chips were dried to a moisture percentage of 30% and stored in a relative atmospheric humidity of 80%, at a temperature of 23° C. No visible effects of fungi were registered on the wood chips treated with each of the above compositions for weeks. A (control) comparison-sample of untreated wood chips showed intensive attack by different molds and fungi after some days, under the same conditions.

In another aspect of the present invention treated wood chips were subjected to a naked flame of a Bunsen burner for a short period of time. The treated chips were only partially burned when the flame was removed. In a control sample, untreated chips subject to the same conditions immediately caught fire and continued to burn after the flame was removed, completely.

When wood chips, treated with each of the above compositions were positioned next to ants, the ants would avoid the chips.

Similar results were achieved with other organic materials treated with the above compositions, for example, materials like flakes of paper, mats or chips of cork, cocos, jute, wood, straw or reed.

Example 12

70 parts by weight of the composition produced in example 7 was mixed with 30 parts by weight of a paraffin wax emulsion. Chips of wood were then treated with the resulting composition so that they were completely coated therewith and were then dried. The treated wood chips were artificially rained on and then dried to a moisture percentage of 30%. The treated wood chips underwent storage and flame testing, as were the wood chips treated with each of the compositions in examples 4–11. The treated wood chips showed no effects of fungal growth and they showed resilience to a naked flame.

I claim:

1. A method of protecting wood comprising the steps of applying a coating of a saponified whey composition to wood, said composition comprising a whey saponified with an alkali;

and drying the composition coated wood.

2. The method as claimed in claim 1 wherein the whey is saponified with an alkali selected from the group consisting of caustic soda, sodium carbonate and aqueous alkali soda aluminum hydroxide.

3. The method as claimed in claim 2 wherein the alkali is caustic soda.

4. The method as claimed in claim 2 wherein the alkali is sodium carbonate.

5. The method as claimed in claim 1 wherein said whey is diluted with a quantity of water, said quantity of water being approximately equal to that of said whey.

6. The method as claimed in claim 1 wherein said saponified whey composition further comprises a wax.

7. The method as claimed in claim 1 wherein said saponified whey composition further comprises a resin

8. The method as claimed in claim 7 wherein the resin is an acrylate.

9. The method as claimed in claim 1 wherein said saponified whey composition further comprises a naturally occurring coloring agent.

10. The method as claimed in claim 9 wherein the naturally occurring coloring agent is carotene.

11. A wood protection composition comprising a whey saponified with an alkali selected from the group consisting of caustic soda, sodium carbonate and aqueous alkali soda aluminum hydroxide.

12. The wood protection composition of claim 11 wherein the alkali is caustic soda.

13. The wood protection composition of claim 11 wherein the alkali is sodium carbonate.

14. The wood protection composition of claim 11 wherein the whey is diluted with a quantity of water being approximately equal to that of said whey.

15. The wood protection composition of claim 11 further comprising a wax.

16. The wood protection composition of claim 11 further comprising a resin.

17. The wood protection composition as claimed in claim 16 wherein the resin is an acrylate.

18. The wood protection composition as claimed in claim 11 further comprising a naturally occurring coloring agent.

19. The wood protection composition as claimed in claim 18 wherein the naturally occurring coloring agent is carotene.

* * * * *